United States Patent
Matteucci

(10) Patent No.: US 9,879,799 B2
(45) Date of Patent: Jan. 30, 2018

(54) PRESSURE REGULATOR

(71) Applicant: Cameron International Corporation, Houston, TX (US)

(72) Inventor: Brian Matteucci, Houston, TX (US)

(73) Assignee: Cameron International Corporation, Houston, TX (US)

( * ) Notice: Subject to any disclaimer, the term of this patent is extended or adjusted under 35 U.S.C. 154(b) by 26 days.

(21) Appl. No.: 14/856,162

(22) Filed: Sep. 16, 2015

(65) Prior Publication Data
US 2017/0074422 A1    Mar. 16, 2017

(51) Int. Cl.
| F16K 47/04 | (2006.01) |
| E21B 33/03 | (2006.01) |
| F16K 31/12 | (2006.01) |
| G05D 16/10 | (2006.01) |
| F16K 31/122 | (2006.01) |

(52) U.S. Cl.
CPC .............. *F16K 47/04* (2013.01); *E21B 33/03* (2013.01); *F16K 31/1221* (2013.01); *G05D 16/10* (2013.01)

(58) Field of Classification Search
CPC ...... F16K 47/04; F16K 31/1221; E21B 33/03; G05D 16/04
See application file for complete search history.

(56) References Cited

U.S. PATENT DOCUMENTS

| 618,903 A | 2/1899 | Prince |
| 975,838 A | 11/1910 | Derby |
| 1,233,885 A | 7/1917 | Kuenhold |
| 1,654,642 A | 1/1928 | Geissinger |
| 2,292,871 A | 8/1942 | Dunn |
| 2,440,961 A | 5/1948 | Link |
| 2,887,123 A | 5/1959 | Becker |
| 2,918,081 A | 12/1959 | Lauer, Jr. |
| 3,103,230 A | 9/1963 | Kutsche |
| 3,211,175 A | 10/1965 | Replogle |
| 3,305,208 A | 2/1967 | Bredtschneider |
| 3,785,398 A | 1/1974 | Lonnemo et al. |
| 4,133,343 A | 1/1979 | Carroll |
| 4,424,738 A | 1/1984 | Leighton |
| 4,456,028 A | 6/1984 | Watson |
| 4,493,335 A | 1/1985 | Watson |
| 4,506,693 A * | 3/1985 | Acker ..................... F16K 3/188 137/116.3 |
| 5,257,646 A | 11/1993 | Meyer |
| 5,307,834 A | 5/1994 | Tatarek-Gintowt et al. |

(Continued)

OTHER PUBLICATIONS

PCT International Search Report & Written Opinion; Application No. PCT/US2016/052297; dated Nov. 7, 2016; 12 pages.

*Primary Examiner* — Jessica Cahill
*Assistant Examiner* — Daphne M Barry
(74) *Attorney, Agent, or Firm* — Fletcher Yoder, P.C.

(57) ABSTRACT

A system including a pressure regulator configured to regulate a flow of pressurized fluid in a hydrocarbon extraction system, the pressure regulator, including a housing having a chamber, a biasing system configured to provide a biasing force, a sensing piston disposed within the chamber, wherein the sensing piston is responsive to pressure within the chamber and the biasing force from the biasing system, and a supply seal plate comprising a first fluid supply passageway configured to reduce oscillations of the sensing piston.

19 Claims, 9 Drawing Sheets

(56) References Cited

U.S. PATENT DOCUMENTS

| | | |
|---|---|---|
| 5,522,421 A | 6/1996 | Holt et al. |
| 5,678,602 A | 10/1997 | Cannet et al. |
| 6,176,256 B1 | 1/2001 | Nakajima et al. |
| 6,334,633 B1 | 1/2002 | Nguyen et al. |
| 6,651,696 B2 | 11/2003 | Hope et al. |
| 7,000,890 B2 | 2/2006 | Bell et al. |
| 7,520,297 B2 * | 4/2009 | Bell ................ G05D 16/10 137/505 |
| 7,757,703 B2 * | 7/2010 | Bell ................ G05D 16/10 137/116.3 |
| 2002/0066562 A1 | 6/2002 | Nice |
| 2005/0151099 A1 | 7/2005 | Bell et al. |
| 2012/0234396 A1 | 9/2012 | Bell |
| 2014/0272658 A1 | 9/2014 | Curello |

\* cited by examiner

PRESSURE REGULATOR

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Drilling systems use pressurized fluid (e.g., hydraulic fluid) to operate various pieces of equipment (e.g., blowout preventers) while drilling or extracting natural resources (e.g., oil, natural gas). In order to regulate the pressurized fluid, drilling systems use pressure regulators. Some of these pressure regulators use axial movement of a piston to open and close supply and vent ports to block over-pressurization of various components. Unfortunately, as the pressure regulator controls the pressure of the fluid, the piston may oscillate rapidly creating instability in the fluid flow (e.g., hammering, chattering).

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Drilling systems use pressurized fluid (e.g., hydraulic fluid) to operate various pieces of equipment while drilling or extracting natural resources (e.g., oil, natural gas). For example, the hydrocarbon extraction system may operate a blowout preventer using pressurized fluid. However, some components may be rated to operate below a threshold pressure. In order to block delivery of pressurized fluid above the threshold level, the hydrocarbon extraction system may use a pressure regulator. In some embodiments, the pressure regulator uses a sensing piston that moves axially within a housing to allow or block fluid flow depending on the pressure of the fluid. In order to reduce oscillation of the sensing piston, the pressure regulator may include passageways that enable linear or substantially linear throttling of the pressurized fluid flow.

Figure 1:
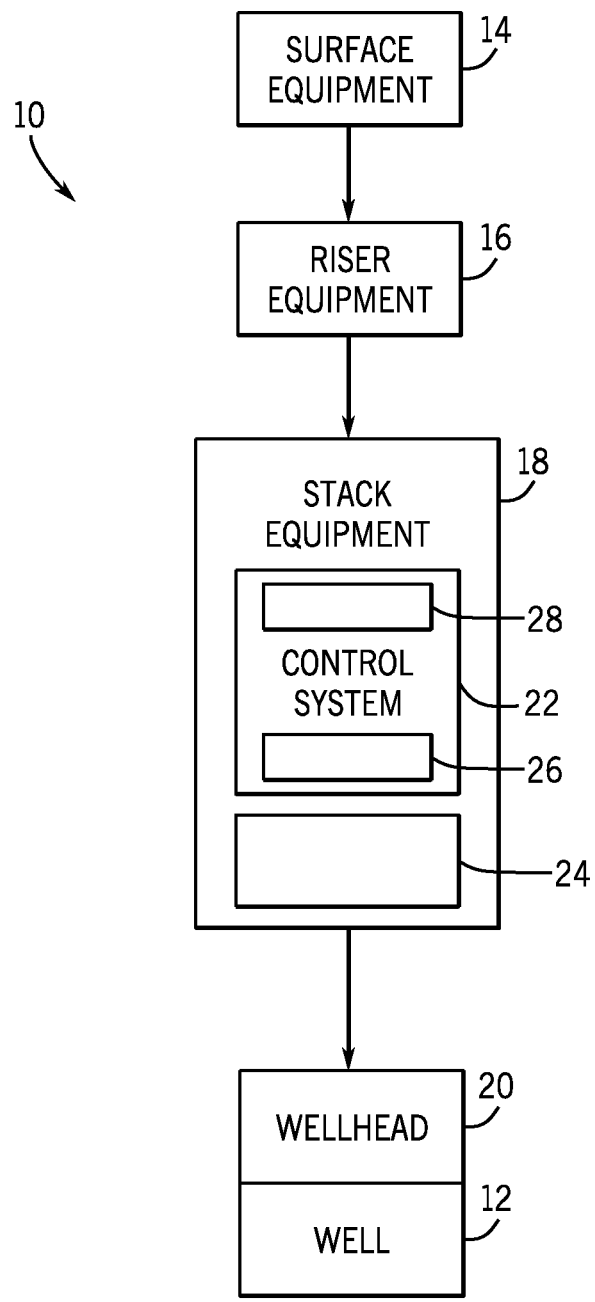
FIG. 1 is a schematic of an embodiment of a hydrocarbon extraction system with a pressure regulator.

FIG. 1 is a schematic of an embodiment of a hydrocarbon extraction system 10. In operation, the hydrocarbon extraction system 10 extracts oil and/or natural gas from a well 12. The hydrocarbon extraction system 10 may be employed in a variety of drilling or extraction applications, including onshore and offshore (e.g., subsea) drilling applications. The hydrocarbon extraction system 10 may include a variety of equipment, including surface equipment 14, riser equipment 16, and stack equipment 18 that couples to the well 12 via a wellhead 20. In a subsea environment, the surface equipment 14 (e.g., riser gas handler, etc.) may be mounted to a drilling rig above the surface of the water, while the stack equipment 18 (e.g., blowout preventer, casing hanger, tubing hanger, Christmas trees, etc.) is coupled to the wellhead 20 near the sea floor. In order to extract hydrocarbons, the hydrocarbon extraction system includes riser equipment 16 (e.g., pipes) that fluidly couples the surface equipment 14 to the stack equipment 18.

In some embodiments, the stack equipment 18 may include a control system 22 that actuates and/or controls one or more components 24 (e.g., valves, BOP, etc.) with a pressurized working fluid 30. In order to control the pressurized working fluid 30, the control system 22 may include a pressure regulator 26. In FIG. 1, the pressure regulator 26 couples to the stack equipment 18. However, the pressure regulator 26 may be disposed in other portions of the hydrocarbon extraction system 10, such as the surface equipment 14. Furthermore, certain embodiments may include multiple pressure regulators 26, which may receive and transmit a working fluid 30 at the same or different pressure levels. For example, two pressure regulators 26 may each receive or transmit working fluids at different pressure levels.

In operation, the pressure regulator 26 regulates fluid pressure from a pressurized fluid source 28 for use by one or more of the components 24. The pressurized fluid source 28 may couple to the surface equipment 14 and/or the stack equipment 18. In some embodiments, the pressurized fluid source 28 may be a bank of accumulator tanks that contains a working fluid 30 (e.g., hydraulic fluid) at a pressure greater than the pressure rating of one or more components 24. As will be explained below, the pressure regulator 26 regulates the pressure of the working fluid 30 so that the components 24 receive an appropriate working pressure. Moreover, the pressure regulator 26 increases the stability of the pressurized fluid flow, which reduces "hammering" or "chattering."

Figure 2:
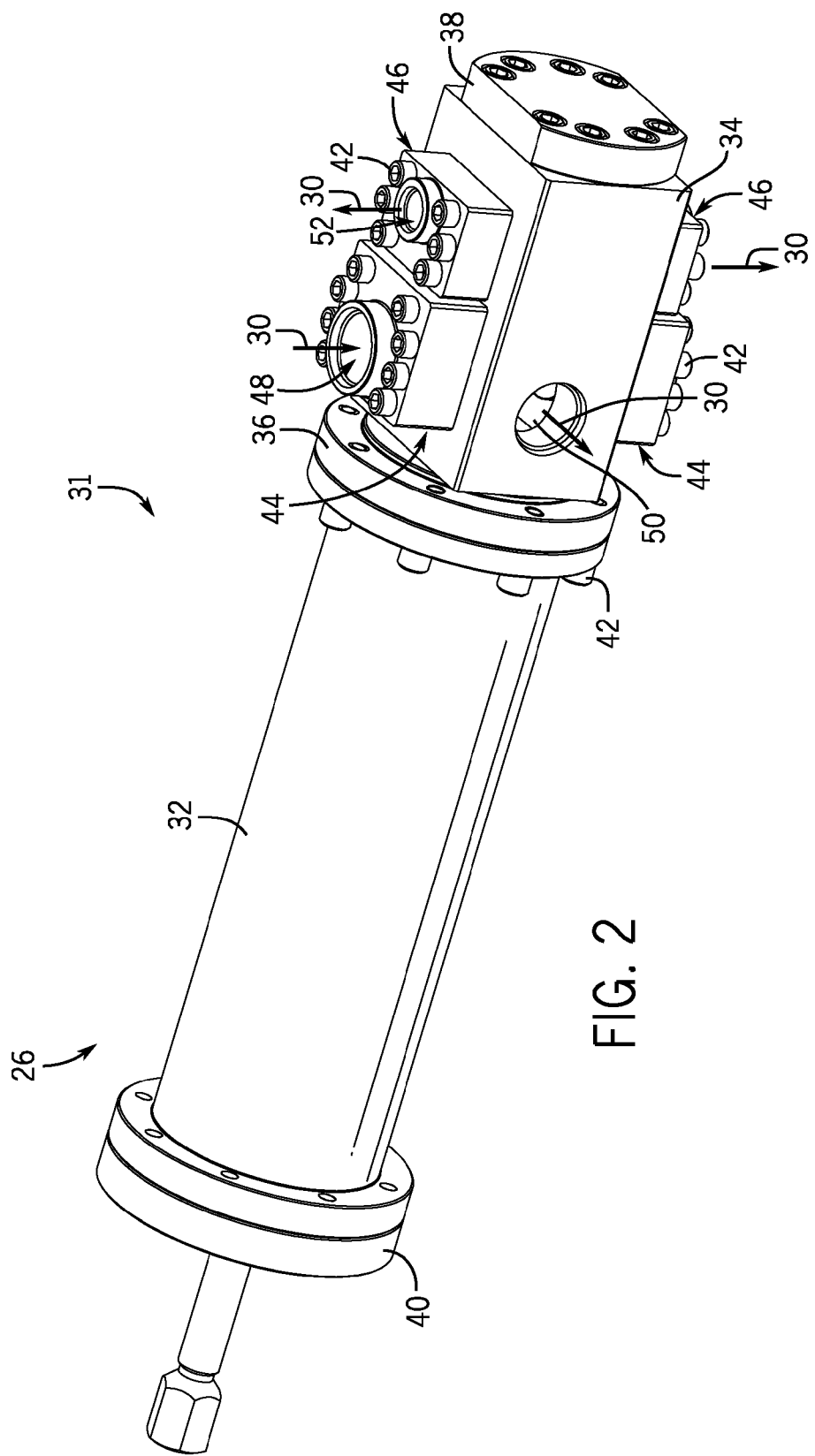
FIG. 2 is a perspective view of an embodiment of a pressure regulator.

FIG. 2 is a perspective view of an embodiment of a pressure regulator 26. The pressure regulator 26 includes a housing or body 31 having a first housing 32 (e.g., annular or cylindrical housing) and a second housing 34 (e.g., rectangular housing) for receiving various internal components. Coupled to the second housing 34 are first and second end caps 36 and 38 (e.g., fastened to or integrated with). As illustrated, the first end cap 36 enables the second housing 34 to couple to the first housing 32, while the second end cap 36 and an end cover 40 retain internal components within the first and second housings 32, 34. The end cover 40 and first and second end caps 36, 38 may be secured to the body 31 via a plurality of fasteners 42 (e.g., bolts). In some embodiments, other fasteners or couplings (e.g., welding) may be used to secure the end cover 40 and the first and second end caps 36, 38.

In operation, the pressure regulator 26 receives and discharges the pressurized working fluid 30 through a pair of supply assemblies 44 and a pair of vent assemblies 46 disposed on opposite sides of the second housing 34. The supply and vent assemblies 44 and 46 may be secured to the second housing 34 in any suitable fashion, such as by fasteners 42. While the presently depicted pressure regulator 26 includes a pair of supply assemblies 44 and a pair of vent assemblies 46, other embodiments may include a different number of such supply and vent assemblies 44, 46 (e.g., 1, 2, 3, 4, 5, etc.). As illustrated, the pressurized working fluid 30 (e.g., liquid, gas, or a combination thereof) enters the pressure regulator 26 through the supply ports 48 of the supply assemblies 44. After passing through the pressure regulator 26, the working fluid 30 may be output at a second (regulated) pressure via a regulated pressure outlet port 50 in the second housing 34. In some instances, if the pressure inside the pressure regulator 26 exceeds a certain threshold, the working fluid 30 may be vented from the pressure regulator 26 through vent ports 52 of the vent assemblies 46.

Figure 3:
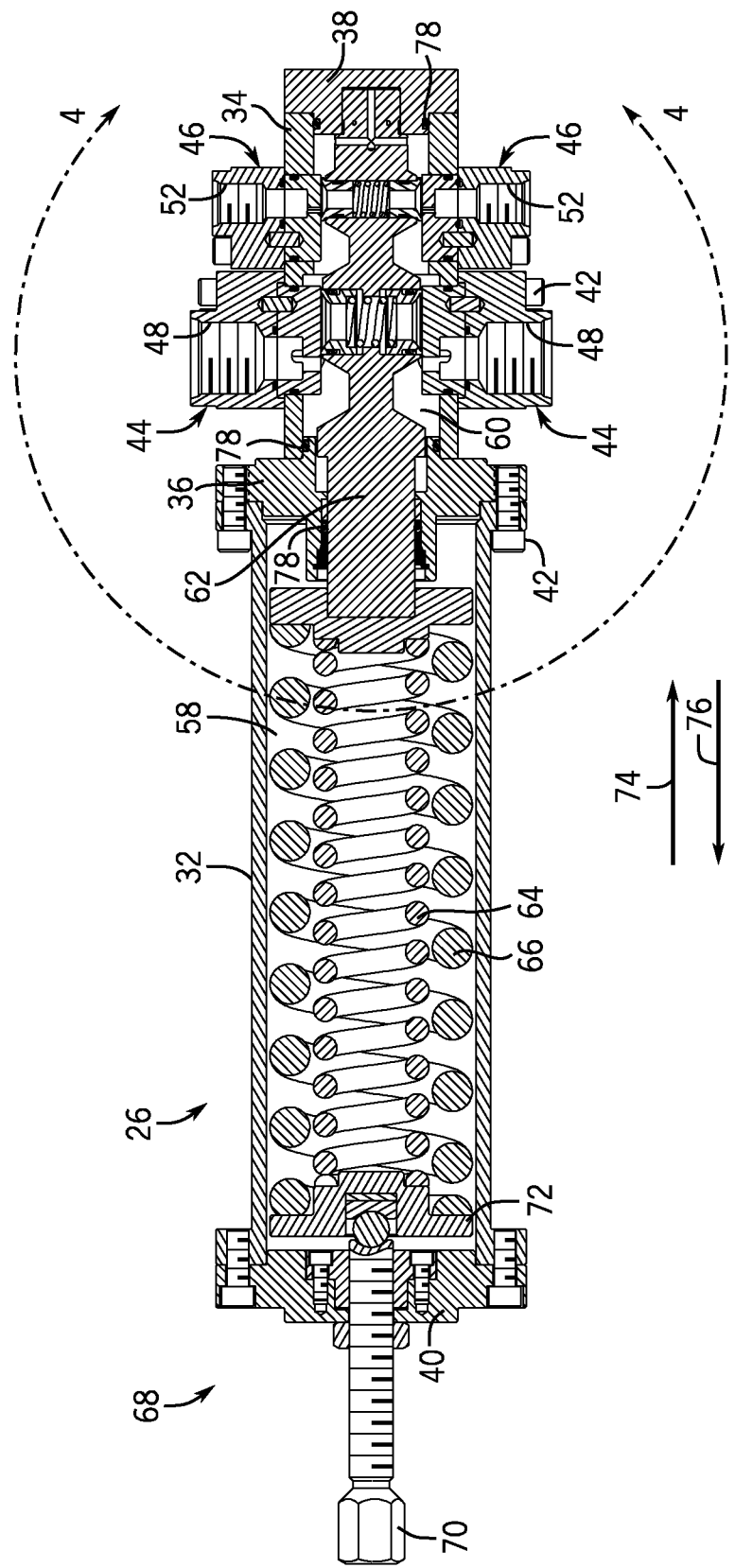
FIG. 3 is a cross-sectional view of an embodiment of the pressure regulator in FIG. 2.

FIG. 3 is a cross-sectional view of an embodiment of the pressure regulator 26 in FIG. 2. As illustrated, first and second housings 32, 34 include respective first and second chambers 58, 60. A sensing piston 62 (e.g., annular piston) is disposed within the second chamber 60 and extends through the first end cap 36 to divide the second chamber 60 from the first chamber 58 (e.g., spring chamber) in the first housing 32. In some embodiments, the pressure regulator 26 includes a spring-loaded biasing system with one or more springs (e.g., springs 64, 66) disposed in first chamber 58 that bias the sensing piston 62 in an open position. In some embodiments, the pressure regulator 26 may include a pressurized fluid biasing system (e.g., pressure pilot) that biases the sensing piston 62 instead of the springs 64, 66. In some embodiments, the sensing piston 62 may be biased by a combination of pressurized fluid and springs 64, 66. In order to adjust a biasing force of the springs 64, 66, the pressure regulator 26 includes a spring-load-adjustment adjuster 68. As illustrated, the spring-load-adjustment adjuster 68 includes a threaded or rotational adjustor (e.g., a screw 70) that threads through the end cover 40 and couples to a plunger 72 (e.g., plate). In operation, the screw 70 may be threaded further into or out of the end cover 70 to increase or decrease compression of the springs 64, 66. When threaded further into the end cover 70, the screw 70 axially drives the plunger 72 in axial direction 74. The plunger 72 then compresses the springs 64, 66, which increases the biasing force of the springs 64, 66 on the sensing piston 62 in axial direction 74. Likewise, when the screw 70 threads out of the end cover 40 in axial direction 76 the springs 64, 66 expand and relax, which reduces the biasing force of the springs 64, 66 on the sensing piston 62 in axial direction 74. Because the pressure regulator 26 controls the flow of fluid, the pressure regulator 26 includes various seals or o-rings 78 that maintain pressure and block leakage of the working fluid 30 (e.g., leakage between the first and second chambers).

Figure 4:
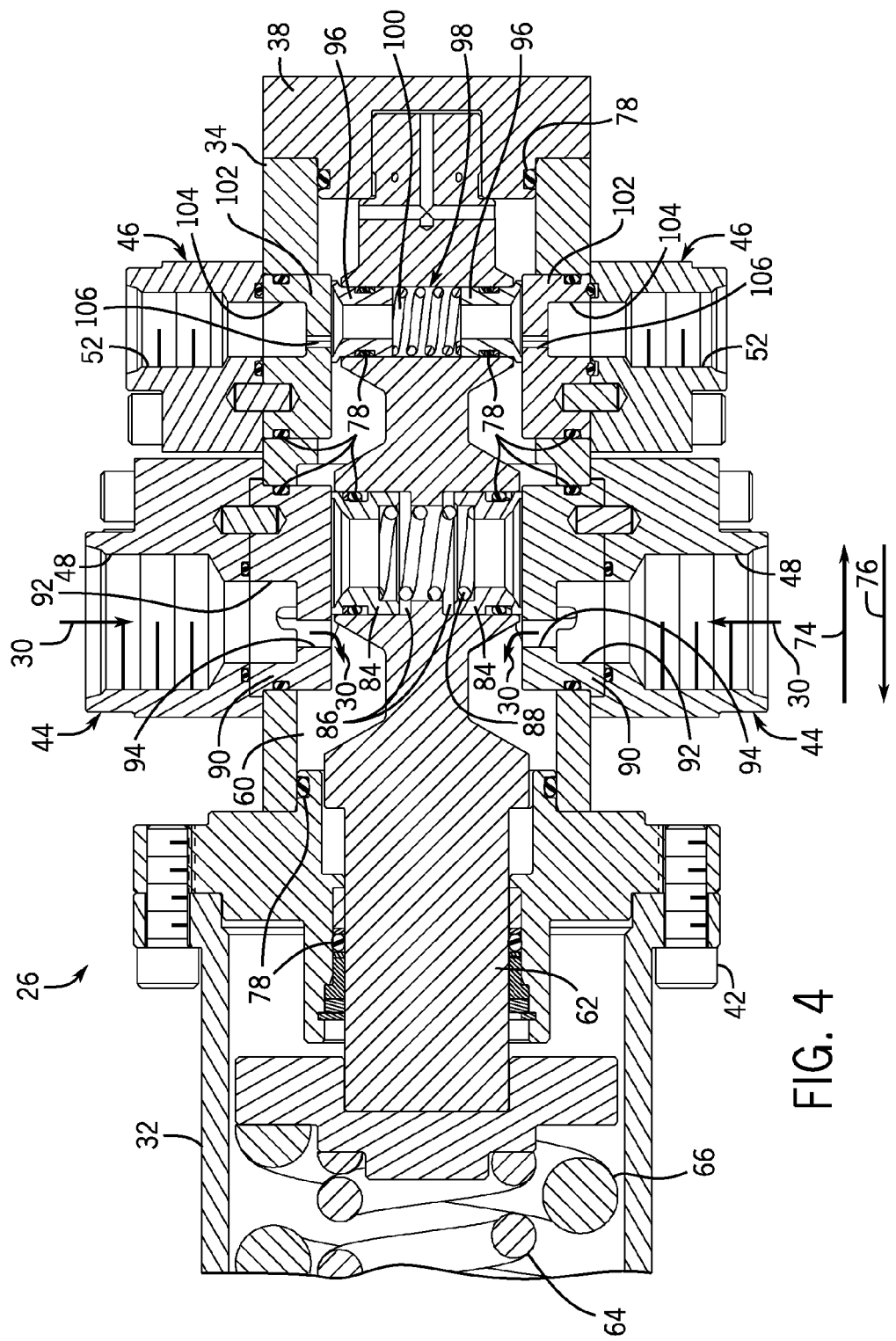
FIG. 4 is a detailed view within lines 4-4 of FIG. 3 of an embodiment of the pressure regulator in an open position.

FIG. 4 is a detailed view within lines 4-4 of FIG. 3 illustrating a pressure regulator 26 in an open position. As explained above, the axial movement of the sensing piston 62 controls the flow of the working fluid 30 by blocking or enabling fluid flow through the supply ports 48 and pressure outlet ports 50 (seen in FIG. 2). In order to control the flow of the working fluid 30, the pressure regulator 26 includes supply shear seal rings 84 disposed within an annular recess 86 of the sensing piston 62. In some embodiments, the sensing piston 62 may include a spring 88 in the recess 86 that biases the supply shear seal rings 84 against supply seal plates 90 of the supply assembly 44 to form a seal. The supply seal plates 90 include respective counterbores 92 and fluid supply passageways 94 that enable the flow of the working fluid 30 into the second chamber 60. As will be explained in detail below, the shape of the fluid supply passageways 94 increases fluid flow stability through the pressure regulator 26, thus blocking or reducing undesirable oscillation of the sensing piston 62.

The pressure regulator 26 may also include vent shear seal plates 96 disposed within a recess 98 of the sensing piston 62. The vent shear seal plates 96 may also be biased by a spring 100 against respective vent seal plates 102. The vent seal plates 102 include a counterbore 104 and a fluid vent passageway 106. In operation, the fluid vent passageways 106 enable the working fluid 30 to vent from the second chamber 60 through the vent ports 52. In some embodiments, the shape of the fluid vent passageways 106 may block or reduce undesirable oscillation of the sensing piston 62.

As illustrated in FIG. 4, the pressure regulator 26 is an open position. In the open position, the working fluid 30 is able to flow from the pressurized fluid source 28 (e.g., bank of accumulators) through the fluid supply passageways 94 and into the second chamber 60. The working fluid 30 then passes through the second chamber 60 before exiting through the regulated pressure outlet port 50 (seen in FIG. 2). In operation, the pressure regulator 26 will remain in the open position as long as the pressure of the working fluid 30 is below a first pressure threshold (e.g., desired operating pressure of downstream components). In other words, as long as the pressure of the working fluid 30 is less than the biasing force of the springs 64, 66 the fluid supply passageways 94 will remain uncovered. Furthermore, while the fluid supply passageways 94 remains open, the sensing piston 62 blocks fluid flow through the vent passageways 106.

Figure 5:
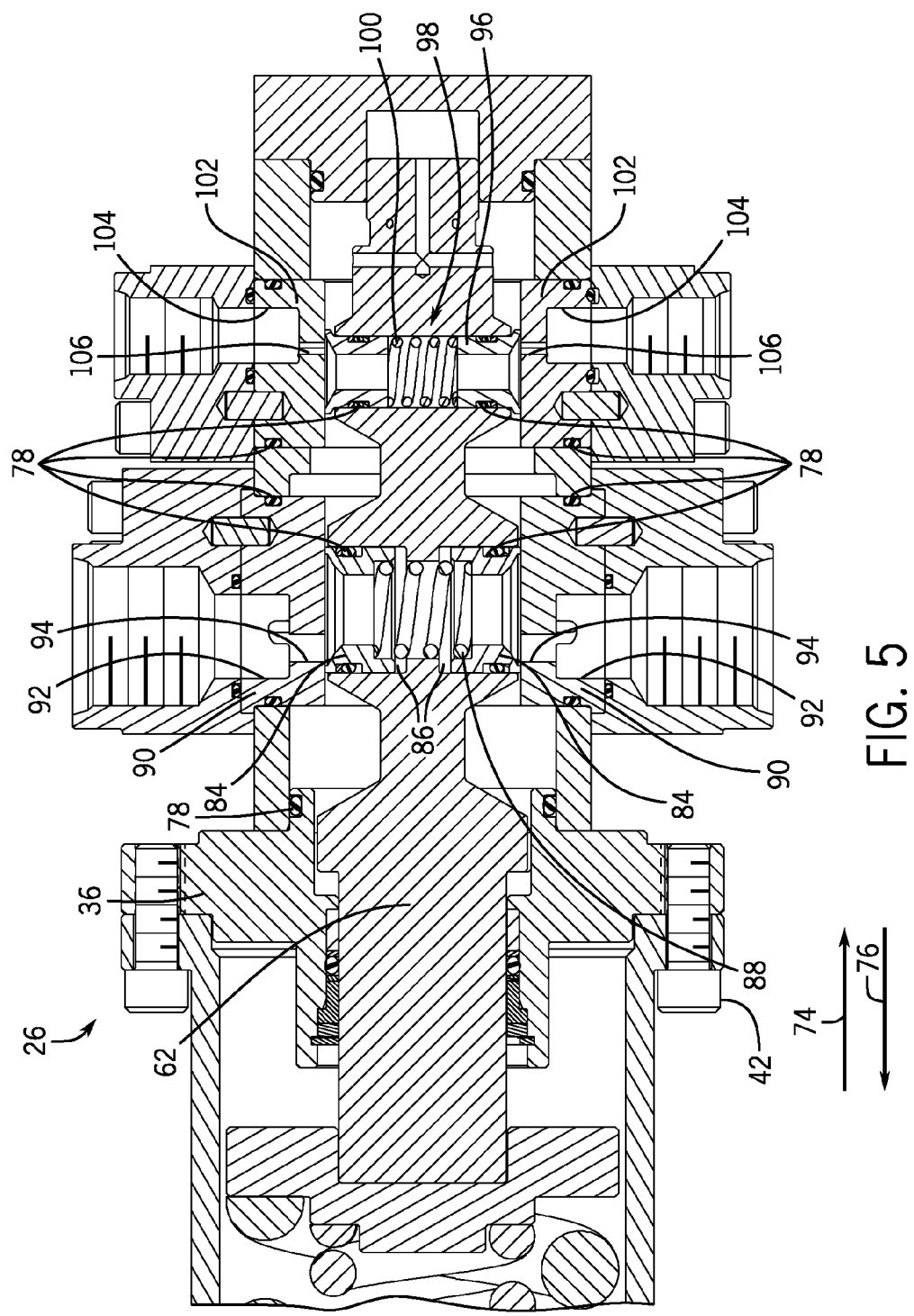
FIG. 5 is a detailed view within lines 4-4 of FIG. 3 of an embodiment of the pressure regulator in a closed position.

As illustrated in FIG. 5, the pressure regulator 26 is in a closed position that blocks the flow of working fluid 30 into the second chamber 60. The pressure regulator 26 transitions from the open position to the closed position when the pressure of the working fluid 30 increases past the first pressure threshold. In other words, when the pressure of the working fluid 30 overcomes the biasing force of the springs 64, 66 and drives the sensing piston 62 in axial direction 76. As the sensing piston 62 moves in axial direction 76, the supply seal rings 84 cover the fluid supply passageways 94 blocking further fluid flow through the pressure regulator 26. Once the pressure of the working fluid 30 decreases below the first pressure threshold, the springs 64, 66 bias/drive the sensing piston 62 in axial direction 74, which opens the fluid supply passageways 94. In this way, the pressure regulator 26 blocks (e.g., regulates) the flow of working fluid 30 to downstream components 24 when the pressure of the working fluid 30 is above the first pressure threshold.

Figure 6:
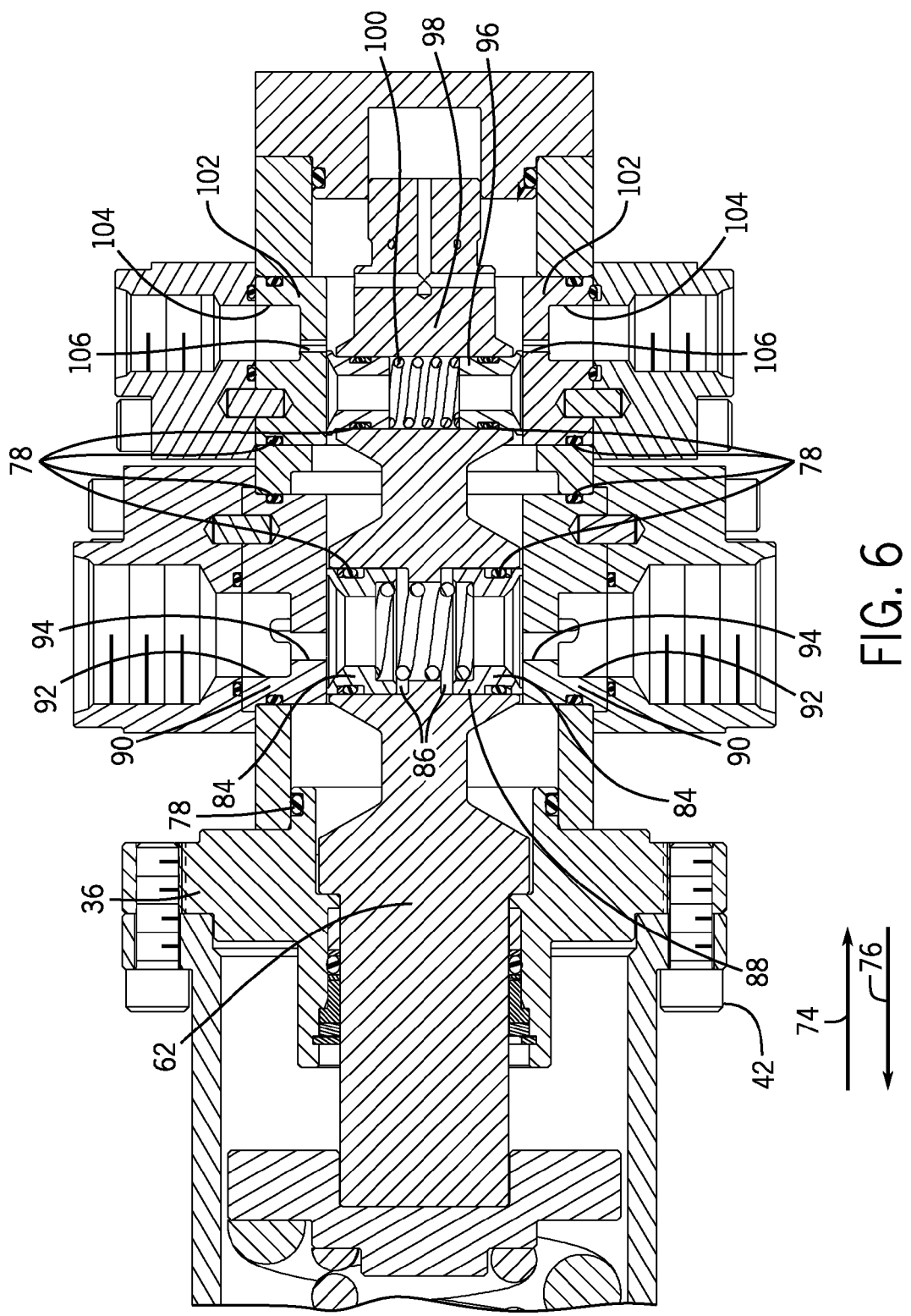
FIG. 6 is a detailed view within lines 4-4 of FIG. 3 of an embodiment of the pressure regulator in a vent position.

As illustrated in FIG. 6, the pressure regulator 26 is in a position that blocks the flow of working fluid 30 into the second chamber 60 but still enables the working fluid 30 to vent. For example, if the pressure of the working fluid 30 continues to increase within the second chamber 60, the pressure of the working fluid 30 will continue to drive the sensing piston 62 in axial direction 76. If the pressure of the working fluid 30 then passes a second threshold pressure, the movement of the sensing piston 62 will uncover the fluid vent passageways 106 enabling the pressure regulator 26 to vent excess pressurized working fluid 30. As explained above, in some embodiments, the shape of the fluid vent passageways 106 may block or reduce undesirable oscillation of the sensing piston 62 when the pressure regulator 26 vents working fluid 30.

Figure 7:
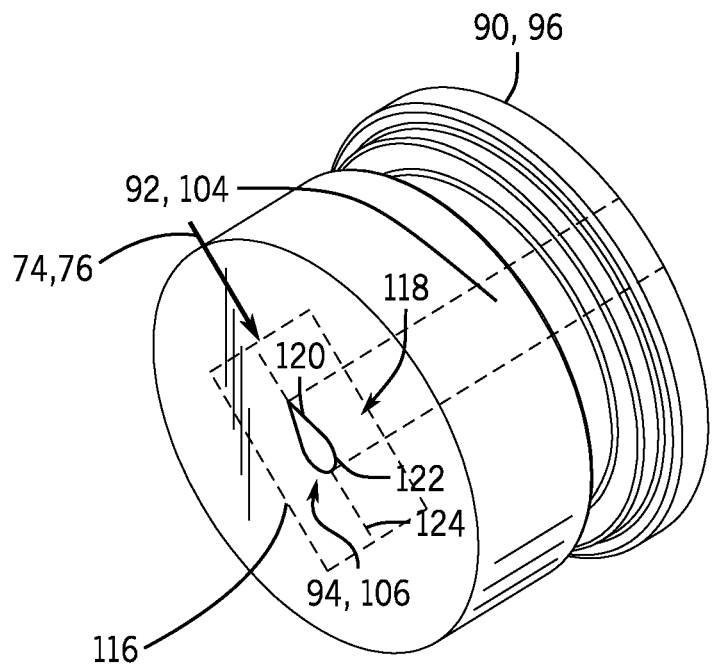
FIG. 7 is a perspective view of an embodiment of a supply seal plate or vent seal plate.

FIG. 7 illustrates an embodiment of a supply seal plate 90 or a vent seal plate 96 with a window 116 (e.g., fluid supply window, fluid vent window). The window 116 may include one or more fluid supply passageways 94 in the supply seal plates 90 and/or one or more fluid vent passageways 106 in the vent seal plates 96 that stabilize the flow of the working fluid 30 through the pressure regulator 26. By stabilizing the flow of the working fluid 30, the pressure regulator 26 reduces oscillation of the sensing piston 62, and thus undesirable wear. As illustrated, the fluid supply passageway 94 or fluid vent passageway 106 may have a snow cone or teardrop shape 118 with a triangular-shaped portion 120 coupled to a round portion 122. However, in some embodiments, the fluid passageways 94, 106 may be triangular by not including the round portion 122. dangerous In operation, the snow cone/teardrop shape 118 or a triangular shaped fluid passageway 94 and/or 96 increases stability by creating a substantially linear throttling action as the sensing piston 62 covers and uncovers the fluid supply passageways 94 and/or the fluid vent passageways 106 in axial directions 74, 76 of FIG. 6 (e.g., axial direction 74 for the fluid supply passageways 94 and axial direction 76 for the fluid vent passageways 96). In other words, as the springs 64, 66 drive the sensing piston 62 axially in direction 74 of FIG. 6, the supply seal rings 84 gradually allow more fluid flow into the second chamber 60 instead of rapidly increasing flow. In contrast, rapid increases in flow are associated with increased oscillation of the sensing piston 62, as the sensing piston 62 moves axially in directions 74, 76 to regulate fluid pressure. Furthermore, in order to facilitate the linear throttling action, an axis 124 of the fluid supply passageway 94 and/or the fluid vent passageway 106 may be aligned substantially parallel with an axis of the sensing piston 62 (e.g., within 0-30, 0-10, 0-5, 1-25, 2-20, 3-15, 4-10 degrees). Moreover, the triangular-shaped portion 120 of the snow cone or teardrop shape 118 may be oriented so that the triangular-shaped portion 120 is uncovered before the round portion 122 as the sensing piston moves in axial direction 74. In contrast, if the fluid vent passageway 106 has a snow-cone shape 118, the triangular portion 120 may be oriented so that as the sensing piston 62 moves in axial direction 76 of FIG. 6, the triangular portion 102 is uncovered before the round portion 122.

Figure 8:
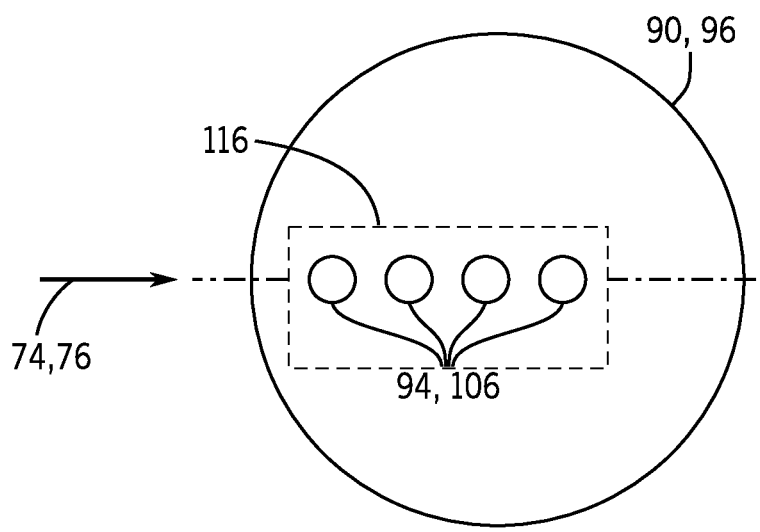
FIG. 8 is front view of an embodiment of a supply seal plate or vent seal plate.
Figure 9:
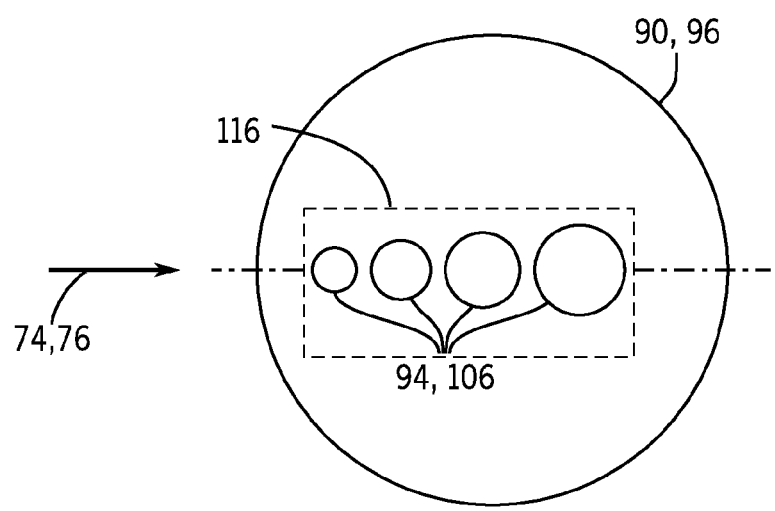
FIG. 9 is front view of an embodiment of a supply seal plate or vent seal plate.

FIG. 8 illustrates a front view of an embodiment of a supply seal plate 90 or a vent seal plate 96 with multiple fluid supply passageways 94 or fluid vent passageways 106 (e.g., 2, 3, 4, 5, or more) in the window 116. In operation, the multiple fluid supply passageways 94 or fluid vent passageways 106 incrementally increase the flow of fluid into and/or out of the second chamber 60 as the sensing piston 62 moves axially (e.g., axial directions 74, 76). In this manner, the multiple fluid supply passageways 94 or fluid vent passageways 106 enable a substantially linear throttling action that reduces oscillation of the sensing piston 62. As illustrated, the passageways 94, 106 are circular, but some embodiments may include other shapes (e.g., rectangular, semi-circular, snow cone, triangular, etc.). Moreover, some embodiments, may have multiple passageways 94, 106 that differ in shape and/or size with respect to each other. For example, and as illustrated in FIG. 9 the size of the passageways 94, 106 may gradually increase in the direction of uncovering.

Figure 10:
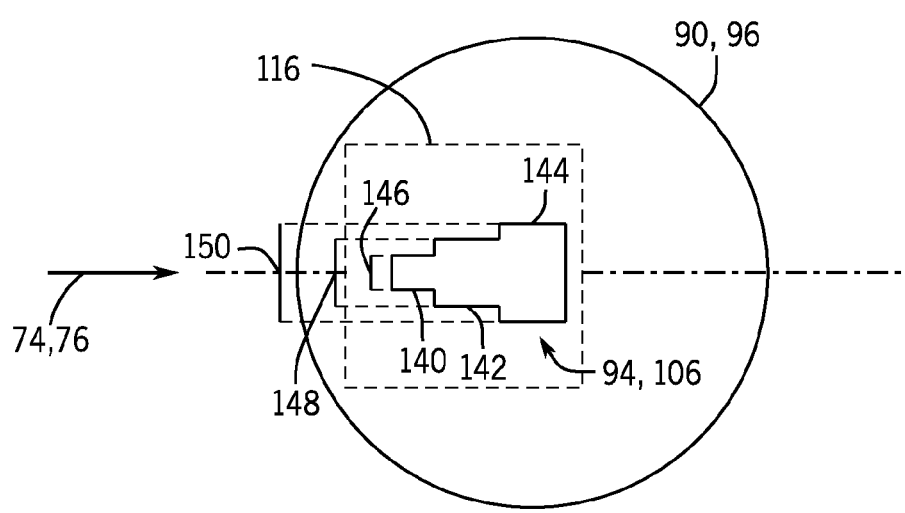
FIG. 10 is front view of an embodiment of a supply seal plate or vent seal plate.

FIG. 10 illustrates a front view of an embodiment of a supply seal plate 90 or a vent seal plate 96 with a single passageway 94, 106 in the window 116 that gradually increases in size in a stepwise manner. For example, the passageways 94, 106 may include a first rectangular portion 140, a second rectangular portion 142, and a third rectangular portion 144. Each of these portions 140, 142, and 144 may have a corresponding width 146, 148, and 150 that is larger than the one preceding it. Accordingly, in operation, the gradual stepwise increase in size of the passageways 94, 106 may facilitate a substantially linear throttling action. It should be understood that in some embodiments, the portions 140, 142, and 144 may have a different shape and there may also be a different number of portions (e.g., 2, 3, 4, 5, or more).

Figure 11:
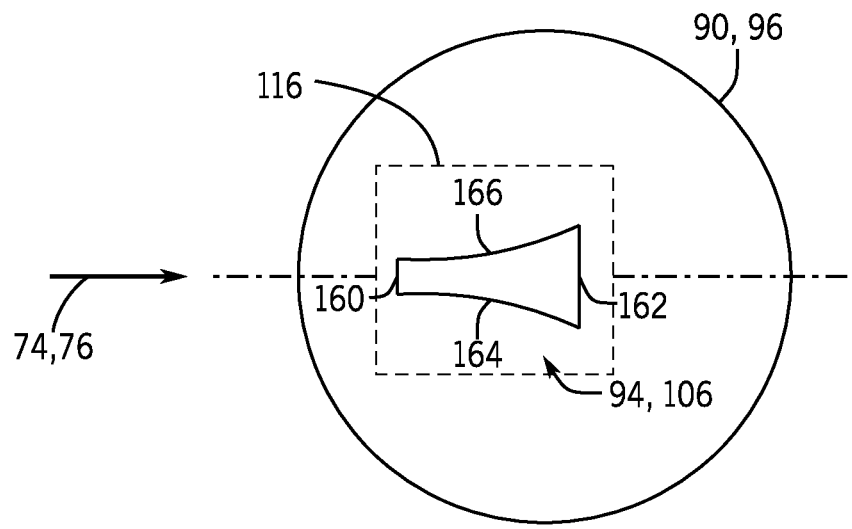
FIG. 11 is front view of an embodiment of a supply seal plate or vent seal plate.

FIG. 11 illustrates a front view of an embodiment of a supply seal plate 90 or a vent seal plate 96 with a single passageway 94, 106 in the window 116 that gradually increases in size in a nonlinear manner. The passageways 94, 96 may include a first end wall 160 and a second end wall 162 that are parallel or substantially parallel to each other. Connecting the first end wall 160 to the second end wall 162 are first and second concave walls 164, 166. As illustrated, the first and second concave walls 164, 166 gradually increase the size of the passageways 94, 106. Accordingly, as the pressure regulator 26 operates, the passageways 94, 106 gradually increase the fluid flow and thus the stability of the sensing piston 62 (e.g., linear throttling action as the sensing piston 62 moves in axial direction 74).

Figure 12:
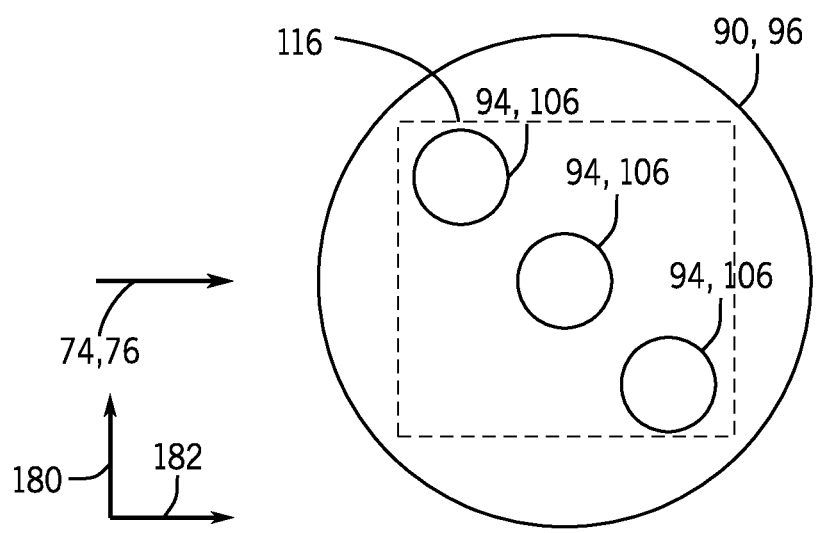
FIG. 12 is front view of an embodiment of a supply seal plate or vent seal plate.

FIG. 12 illustrates a front view of an embodiment of a supply seal plate 90 or a vent seal plate 96 with multiple fluid supply passageways 94 or fluid vent passageways 106 (e.g., 2, 3, 4, 5, or more) in the window 116. As illustrated, the fluid passageways 94, 106 may be offset from one another in both axial directions 180 and 182. In some embodiments, the fluid passageways 94, 106 may be completely offset from one another in both axial directions 180 and 182. In other words, the fluid passageways 94, 106 may not overlap in either axial direction 180 or 182. However, in some embodiments, the fluid passageways 94, 106 may partially overlap in either axial direction 180 and/or 182. In operation, the multiple fluid supply passageways 94 or fluid vent passageways 106 incrementally increase the flow of fluid into and/or out of the second chamber 60 as the sensing piston 62 moves axially (e.g., in axial direction 74). In this manner, the multiple fluid supply passageways 94 or fluid vent passageways 106 enable a substantially linear throttling action that reduces oscillation of the sensing piston 62. As illustrated, the passageways 94, 106 are circular, but some embodiments may include other shapes (e.g., rectangular, semi-circular, snow cone, triangular, etc.). Moreover, some embodiments, may have multiple passageways 94, 106 that differ in shape and/or size with respect to each other. For example, the size of the passageways 94, 106 may gradually increase.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
a pressure regulator configured to regulate a flow of pressurized fluid in a hydrocarbon extraction system, wherein the pressure regulator comprises:
a housing comprising a chamber;
a biasing system configured to provide a biasing force;
a sensing piston disposed within the chamber, wherein the sensing piston is configured to move within the chamber along an axial axis in response to pressurized fluid within the chamber and the biasing force from the biasing system; and
a supply seal assembly supported by the housing and comprising a first fluid supply passageway configured to facilitate flow of the pressurized fluid into the chamber, wherein the first fluid supply passageway extends from a first end to a second end along a central axis that is substantially parallel to the axial axis, and the first fluid supply passageway comprises a triangular portion comprising tapered walls that diverge away from one another between the first end and the second end and a round portion comprising a curved wall that forms the second end and that joins the tapered walls to one another, thereby forming a teardrop shape and facilitating a reduction in oscillations of the sensing piston.

2. The system of claim 1, wherein the supply seal assembly comprises a second fluid supply passageway configured to facilitate flow of the pressurized fluid into the chamber, and the first fluid supply passageway is offset from the second fluid supply passageway with respect to the axial axis.

3. The system of claim 2, wherein the second fluid supply passageway is substantially the same size as the first fluid supply passageway.

4. The system of claim 2, wherein the second fluid supply passageway has the same shape as the first fluid supply passageway.

5. The system of claim 1, wherein the sensing piston is configured to uncover the triangular portion before uncovering the round portion as the pressure regulator adjusts from a closed position to an open position.

6. The system of claim 1, wherein the supply seal assembly comprises a second fluid supply passageway configured to facilitate flow of the pressurized fluid into the chamber, wherein the first fluid supply passageway is offset from the second fluid supply passageway with respect to two different directions.

7. The system of claim 1, comprising a vent seal plate comprising a fluid vent passageway configured to vent the pressurized fluid from the chamber, wherein the fluid vent passageway comprises a respective triangular portion and a respective round portion that form a respective teardrop shape and that facilitate a reduction in oscillations of the sensing piston.

8. The system of claim 7, wherein the sensing piston is configured to uncover the respective triangular portion before uncovering the respective round portion as the pressure regulator adjusts from an open position to a closed position.

9. The system of claim 1, comprising the hydrocarbon extraction system.

10. The system of claim 9, wherein the hydrocarbon extraction system comprises a component, and wherein the pressure regulator regulates pressure for the component.

11. The system of claim 1, wherein the tapered walls are joined to one another at the first end of the first fluid supply passageway.

12. The system of claim 1, wherein each of the tapered walls comprise a respective first wall end and a respective second wall end, and wherein the respective first wall ends are joined to one another, the respective second wall ends are joined to the curved wall, and each of the tapered walls extend linearly between the respective first wall end and the respective second wall end.

13. The system of claim 1, wherein a portion of the curved wall that intersects the central axis forms the second end of the first fluid supply passageway, and the second end is the last portion of the first fluid passageway to be uncovered by the sensing piston as the pressure regulator adjusts from the closed position to the open position.

14. A system comprising:
a pressure regulator configured to regulate a flow of pressurized fluid in a hydrocarbon extraction system, the pressure regulator comprising:
a housing comprising a chamber;
a biasing system configured to provide a biasing force;
a sensing piston disposed within the chamber, wherein the sensing piston comprises an axial axis and is responsive to pressure within the chamber and the biasing force from the biasing system; and
a supply seal assembly supported by the housing and comprising a first fluid supply passageway configured to facilitate flow of the pressurized fluid into the chamber, wherein the first fluid supply passageway extends from a first end to a second end along a central axis that is generally parallel to the axial axis, and wherein the first fluid supply passageway is defined by a first end wall positioned at the first end, a second end wall positioned at the second end, and generally opposed side walls each extending between and coupled to the first end wall and the second end wall, wherein a width between the generally opposed side walls increases between the first end and the second end, thereby facilitating a reduction in oscillations of the sensing piston, wherein the supply seal assembly comprises a second fluid supply passageway configured to facilitate flow of the pressurized fluid into the chamber, wherein the first fluid supply passageway is offset from the second fluid supply passageway with respect to two different directions.

15. The system of claim 14, comprising a vent seal plate comprising a fluid vent passageway configured to vent the pressurized fluid out of the chamber if the pressure of the pressurized fluid exceeds a threshold level.

16. The system of claim 14, wherein the generally opposed side walls are stepped, thereby providing a stepwise increase in the width between the first end and the second end of the first fluid supply passageway.

17. The system of claim 14, wherein the generally opposed side walls are curved walls, thereby provided a gradual increase in the width between the first end and the second end of the first fluid supply passageway.

18. A method comprising:
 biasing a sensing piston positioned within a housing of a pressure regulator in a first axial direction along an axial axis with a biasing system;
 blocking fluid flow into a chamber defined by the housing of the pressure regulator with the sensing piston when the pressure of the fluid is greater than a threshold pressure;
 flowing the fluid into the chamber via multiple fluid supply passageways of a fluid supply window of a supply seal assembly, wherein the multiple fluid supply passageways are positioned at discrete locations along the axial axis to gradually increase fluid flow into the chamber via the multiple fluid supply passageways as the sensing piston uncovers the fluid supply window as the pressure regulator adjusts from a closed position to an open position thereby reducing oscillation of the sensing piston.

19. The method of claim 18, wherein a first fluid supply passageway of the multiple fluid supply passageways and a second fluid supply passageways of the multiple fluid supply passageways are offset from one another with respect to two different directions.

* * * * *